UNITED STATES PATENT OFFICE.

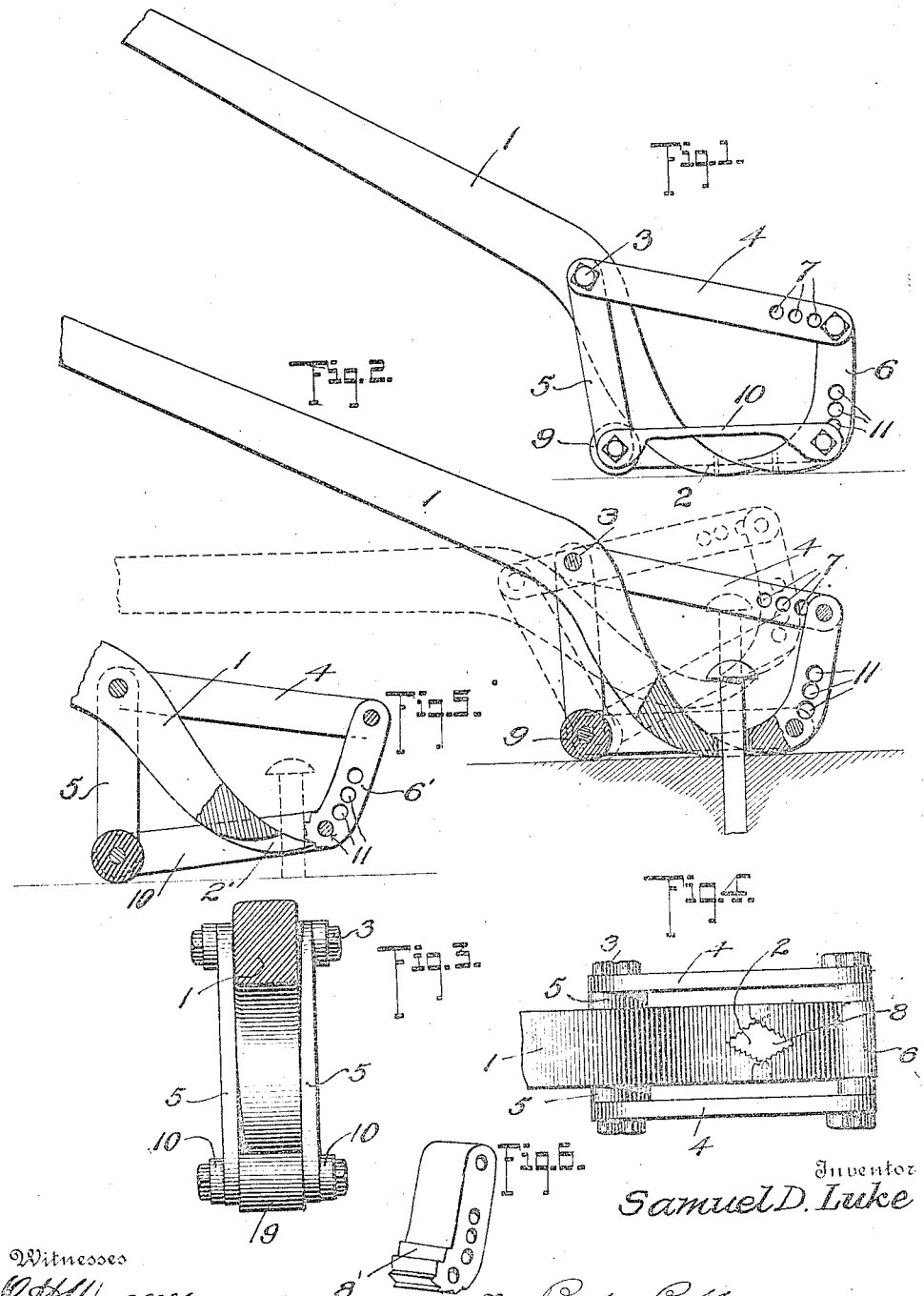

SAMUEL D. LUKE, OF PINETOP, MISSOURI.

BOLT-EXTRACTOR.

1,046,617.  Specification of Letters Patent.  Patented Dec. 10, 1912.

Application filed December 1, 1911.  Serial No. 663,329.

*To all whom it may concern:*

Be it known that I, SAMUEL D. LUKE, a citizen of the United States, residing at Pinetop, in the county of Taney and State of Missouri, have invented certain new and useful Improvements in Bolt-Extractors, of which the following is a specification.

This invention relates to bolt or nail extractors, and primarily to that class in which a claw bar is used, which has its fulcrum capable of movement.

In constructing a device of the above character, the clamping claw or member is afforded a greater clamping power when the device is operated, thereby assuring a secure gripping of the nail or spike.

For a full understanding of the present invention, reference is to be had to the following description and to the accompanying drawings, in which—

Figure 1 is a side elevation of the present invention, having one of the link connections broken away to more clearly disclose the construction of the claw members. Fig. 2 is a similar view disclosing the claw members gripping a bolt or spike. Fig. 3 is a rear elevation of the device, as shown in Fig. 1. Fig. 4 is a top plan view thereof. Fig. 5 is a sectional view of a nail extractor employing a modified form of clamping member. Fig. 6 is a detail view of the modified form of clamping member.

Throughout the following detail description and on the several figures of the drawings, similar parts are referred to by like reference characters.

In constructing the present invention, the claw bar 1 is employed having the claw 2 provided on one terminal thereof, and adjacent to said terminal, the bar or lever 1 is apertured to receive the pin 3 on which is pivotally mounted the link members 4 and 5. A second claw or clamping member 6 is adjustably connected to the link member 4 through the openings 7 and has a claw terminal 8 overlapping the claw 2, as is clearly illustrated in Fig. 1. By so constructing and positioning the clamping member 6, it will be impossible for said member to become displaced. The link members 5 have interposed therebetween at their free terminals an anti-friction roller bearing 9, which forms the fulcrum for the lever 1.

The bearing member 9 is adjustably connected by the link members 10 to the clamping member 6, which latter is provided with a plurality of perforations 11.

In operating the device, the spike is placed in the claw 2, after which the clamping member 6 is closed thereagainst, as disclosed in Fig. 2, thus causing the bearing or fulcrum member 9 to be spaced from the lever 1. The lever 1 is then depressed, which will tend to draw the clamping member 6 toward the spike, thereby causing said clamping member to more securely grip the spike, which prevents the latter from slipping when being extracted. After the lever 1 has been depressed to a certain point; the fulcrum member 9 will have a tendency to move from under said lever, which movement will force the clamping member from engagement with the spike. Furthermore, the spike is extracted in a vertical position, thereby eliminating the disadvantages of the extractors now on the market, namely, bending of the spike when extracted, owing to the movement of the claw member, and enlargement of the hole caused by the latter movement. In the present invention, extracting the spike in a vertical path is permitted through the roller bearing 9, which advances toward the spike on movement of the lever 1, as disclosed in the dotted lines of Fig. 2.

In the modified construction shown in Fig. 5, the clamping member 6' is provided on its clamping terminal with a plurality of engaging teeth or serrations 8', any one of which may be engaged by the claw 2' of the lever 1', which will enlarge the opening in the claw 2' or decrease the same, depending upon the tooth engaged for extracting different sized spikes. Furthermore, the serrations 8' which are above the tooth engaged by the claw 2', are adapted to engage or bite into the spike, which doubly secures the spike from slipping.

Having thus described the invention, what is claimed as new is:

1. A device of the class described, consisting of a claw bar provided with a claw at its operative end, a claw member adapted to engage said claw for retaining a spike in the latter when forced thereagainst, a member connecting said claw bar and claw member, a link pivotally connected to said claw bar, a link pivotally connected to said claw member, and a pivotal connection for said two links arranged below the claw bar ar adapted to serve as a fulcrum bearing for said claw bar.

2. A device of the class described, consisting of a claw bar provided with a claw at its operative end, a claw member adapted to engage said claw for retaining a spike in the latter when forced thereagainst, a member connecting said claw bar and claw member, a pair of links pivotally connected to said claw bar, one link being arranged on each side of the claw bar, a pair of links pivotally connected with said claw member, one link being arranged on each side of the claw member, said pairs of links being pivotally connected together below the claw bar and their pivotal connection serving as a fulcrum bearing for said claw bar.

3. A device of the class described consisting of a claw bar provided with a claw at its operative end, a claw member adapted to engage said claw for retaining a spike in the latter when forced thereagainst, a link pivotally connected to said claw member and also pivotally connected to said claw bar, a bearing member for said claw bar arranged beneath the same and movable relatively thereto, a link connecting said bearing member with said claw bar, and a link pivotally connecting said bearing member with said claw member.

4. A device of the class described consisting of a claw bar provided with a claw at its operative end, a claw member adapted to engage said claw for retaining a spike in the latter when forced thereagainst, a link connecting said claw bar and claw member, a bearing member consisting of a roller connected with said claw bar and movable relatively thereto, and a member pivotally connected with said bearing member and having an adjustable pivotal connection with said claw member, said claw member having a plurality of teeth for engaging said claw.

5. A device of the class described consisting of a claw bar provided with a claw at its operative end, a claw member adapted to engage said claw for retaining a spike in the latter when forced thereagainst, a link pivotally connected to said claw member and also pivotally connected to said claw bar, a bearing member consisting of a roller for said claw bar arranged beneath the same and movable relatively thereto, a pair of links pivotally connecting said bearing member with said claw bar, one link being arranged on each side of the claw bar, and a pair of links pivotally connecting said bearing member with said claw member, one link being arranged on each side of the claw member.

6. A device of the class described consisting of a claw bar provided with a claw at its operative end, a claw member adapted to engage said claw for retaining a spike in the latter when forced thereagainst, a link pivotally connected to said claw member and also pivotally connected to said claw bar at a point above the claw thereon, a bearing member for said claw bar having its axis of movement movable toward and away from said claw bar, a pair of links pivotally connecting said bearing member with said claw bar at a point above the claw thereon, one link being arranged on each side of said claw bar, and a pair of links pivotally connected to said bearing member and having an adjustable and pivotal connection with said claw member, the latter being provided with a plurality of teeth for engaging with the claw on said claw bar.

In testimony whereof I affix my signature in presence of two witnesses.

SAMUEL D. LUKE.

Witnesses:
J. A. BURNETT,
J. W. HERYFORD.